Oct. 21, 1969  K. SCHRAUF  3,473,488

DOUGH WORKING APPARATUS

Filed Nov. 2, 1967

INVENTOR
KARL SCHRAUF

BY
Stevens, Davis, Miller & Mosher
ATTORNEYS

United States Patent Office 3,473,488
Patented Oct. 21, 1969

3,473,488
DOUGH WORKING APPARATUS
Karl Schrauf, Vorarlberg, Austria, assignor to Gustave A. Seewer, Burgdorf, Bern, Switzerland
Continuation-in-part of application Ser. No. 501,455, Oct. 22, 1965. This application Nov. 2, 1967, Ser. No. 680,058
Claims priority, application Switzerland, Nov. 18, 1966, 16,587/66
Int. Cl. A21c 3/00
U.S. Cl. 107—9                 12 Claims

ABSTRACT OF THE DISCLOSURE

A dough working machine for transforming an irregular mass of bulk dough into a smooth surfaced ball, comprising a dough working member which is circularly movable about a first axis in order to perform a rolling action on the dough and which is also tiltable relative to stationary kneading surfaces.

Dough working apparatus

This application is a continuation-in-part of Ser. No. 501,455, filed on Oct. 22, 1965, and issued as Patent No. 3,370,555, and as in the parent patent the present invention relates to apparatus for working dough of the type which is used in the making of baked food products, such as bread, pastry, etc., and more particularly, the present invention relates to an apparatus for working individual pieces of dough into a generally spherical or pear shape.

Specifically, the invention disclosed herein constitutes a further embodiment of the invention which is disclosed in the parent application and the objects of this invention are the same as those set forth for the invention in the parent patent, namely:

It is an object of this invention to provide an apparatus which is capable of performing a stretching and smoothing effect upon a dough piece surface.

It is a further object of this invention to provide such an apparatus which is capable of working a piece of dough into a smooth spherical or pear shape.

It is a further object of this invention to provide an apparatus of the aforementioned type which is easily adaptable for use in conjunction with known types of dough sheeting and molding machines.

It is a further object of this invention to provide a mechanical means for working a rough piece of dough into a smooth, spherical or pear shape and thereby eliminate the heretofore necessary corresponding manual working of such dough.

It is a further object of this invention to provide an apparatus for working dough in order to provide a saving in labor, time, and cost in the overall dough preparation process relative to heretofore known means for preparing such dough.

The objects of this invention are generally realized through an arrangement whereby a circularly moving kneading member works a dough piece against a stationary kneading surface, with the movable member simultaneously shifting its dough contacting surface in a downward and inward direction relative to the dough piece, the shifting motion acting to pull and stretch the dough towards an apex point beneath the dough piece while the circular motion serves to knead and to transport the dough in a longitudinal direction through the apparatus.

The embodiment disclosed herein is advantageous in various respects, such as structural simplicity and also improved operation, relative to the embodiments disclosed in the parent patent. A specific advantage relative to the embodiment of the parent patent is that there is avoided a snagging or clamping of the dough between the bottom edge of the dough working member and the stationary kneading surface.

Figure 1:
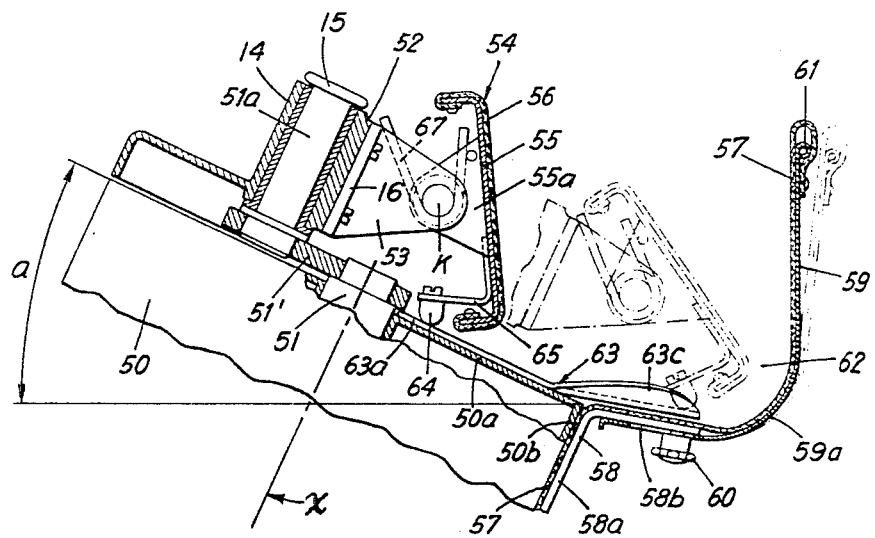
Figure 2:
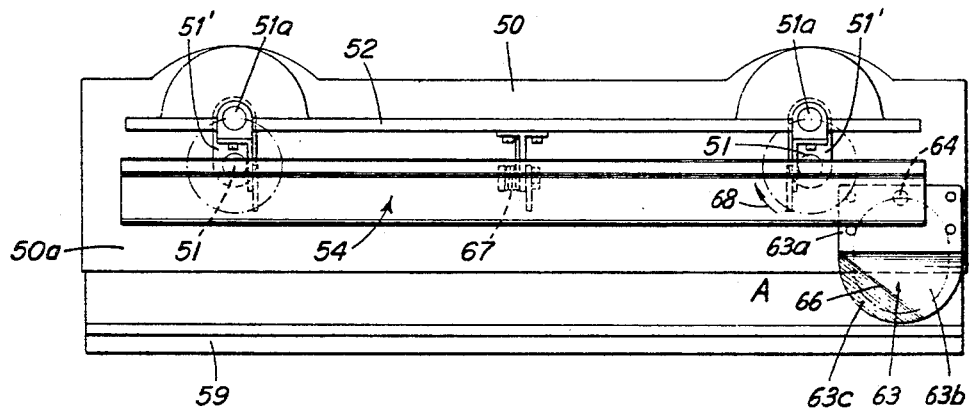

The stated objects and others will become apparent from a reading of the following detailed description which is referred to the accompanying drawing, in which:

FIGURE 1 is a front elevation view of the apparatus according to the invention, parts thereof being in section and the phantom lines indicating another position of the working parts; and, FIGURE 2 is a top view of the apparatus of FIGURE 1 on a smaller scale.

For reasons of brevity, various details may be excluded from herein. It is to be understood, however, that since the invention herein is another embodiment of the same invention which is disclosed in the parent application, all descriptive details which are included in said parent patent and which are obviously applicable to this application, are intended to be incorporated herein.

With reference to the drawing figures, the apparatus of this invention includes a housing 50 within which there is mounted a power transmission assembly for transmitting driving power from a motor (not shown) to the moving kneading member generally denoted by 54.

As in the parent patent, the motor drives belts (not shown) which in turn directly drive one of the parallel crank members 51. The directly driven crank member 51 in turn is drivingly connected to the other crank member 51 by means of a chain or belt which passes over idler rollers which are adjustably mounted on housing 50. The transmission ratios are such that both crank members 51 are rotated at the same speed. Each crank member is drivingly connected, by means hereafter described, to opposite end portions of an elongate (as seen in FIGURE 2) kneading member 54. It is essential, therefore, that both crank members are operated in synchronism since they both actuate a single kneading member. Of course, depending upon the length of member 54 more or fewer crank members may be connected thereto.

With reference to FIGURE 1, the crank members 51 each include a crank web 51' extending radially from the member 51 and a crank pin 51a extending parallel to member 51. Pin 51a, web 51', and member 51 are all rigid with one another so that rotation of member 51 causes web 51' and pin 51a to revolve about the axis of 51. The radius of both webs 51' is arranged to run parallel to each other through adjustment of the aforementioned not shown idler rolls during assembly of the apparatus.

Each crank pin 51a is surrounded by a bearing bushing 14 and pivotally mounted about said bushing is sleeve 52. Sleeve 52 is prevented from axially sliding off one end of the bushing 14 by means of a screw threaded into the end of pin 51a and having a large diameter head 15 which overlaps the edge of sleeve 52. Conversely, removal of said screw permits removal of sleeve 52 for replacement or assembly purposes, etc.

Attached to the sleeve 52, as by screws, are plate members 16 from each of which radially extends a rigid lug 53. Rigidly mounted in the outer end of lug 53 is a pivot pin whose axis is K having a bearing bushing mounted thereon.

The movable kneading member 54, comprises a rigid plate 55 having lugs 55a rigidly extending transversely from the rear face thereof. Each lug 55a is pivotally mounted on the bushing of the corresponding member 53, and it is therefore clear that plate 55 is pivotally supported on sleeve 52 for pivoting motion about axis K and that at the same time axis K can be driven to perform a circular translational movement in a plane perpendicular to axis X which is the rotational axis of crank member 51.

Although only one lug 55a and one lug 53 have been shown, it is possible to provide more than one of each of said lugs for each pivotal mounting of plate 55 on plate member 52.

The upper wall 50a of the housing 50 is inclined to the horizontal by angle a which may, for example, be of the order of 25° and axis χ and that of pin 51a are correspondingly inclined to the vertical so that axis χ is perpendicular to wall 50a and axis K can perform a translatory revolving movement in a plane parallel to wall 55a.

Kneading member 54 comprises a metal plate 55, which is U-shaped in cross section, and a felt covering 56 which extends over the outer surface of said plate 55.

Housing 50 includes a side wall 50b (only partially shown in FIGURE 1) which extends perpendicularly to upper wall 50a. A generally inverted L-shaped member 58 has one leg thereof 58a extending parallel to wall 50b and attached thereto along the outer surface of said wall. The angle between the legs 58a and 58b of L-shaped member 58 is about 110°.

A back wall 59 which is also generally L-shaped in cross section and whose adjoining legs join each other by means of a circular-arcuate crotch portion 59a has one leg thereof bearing upwardly against the underside of leg 58b of member 58. Wall 59 is transversely adjustable (analogously to back wall 25 in the parent patent) relative to leg 58b by means of a screw means 60 which is adapted to secure wall 59 at any of various transverse (left to right in FIGURE 1) positions relative to leg 58b.

A felt web 57 is clamped between housing wall 50b and leg 58a of member 58, said web extending along the upper surface of leg 58b and then along the entire inner surface of wall 59 to the upper end of wall 57 where it is suitably fastened as shown in FIGURE 1.

The afore-described arrangement provides a conveying trough 62 which is of constant width or which may converge slightly in the dough advancing direction (from right to left in FIGURE 2), depending upon the transverse setting of wall 59 by screw means 60, which in turn is dependent upon the nature of the dough which is being worked. In this regard, it will be noted that FIGURE 1 shows only one screw means 60. Actually, however, there are a plurality of screw means 60 (at least two) longitudinally spaced apart (in the left to right direction in FIGURE 2) from each other. It is seen, therefore, that one longitudinal end of wall 59 may be transversely adjusted relative to leg 58b to a different extent than the other end of said wall 59.

It is furthermore seen that housing wall 50a is more steeply inclined to the horizontal than is leg 58b since the angle between legs 58a and 58b is greater than 90° (in this case about 110°).

If for instance the loading station for the pieces of dough to be worked is located at A (FIGURE 2), then, arranged in front of this station, on the upper wall 50a, there is fastened a control plate 63 made of stiff plate material, the top of which is contacted by a feeler member 64 which is fastened by means of a sheet metal angle bracket 65 to the body 55 of the dough working member 54.

The control plate 63 is bent in a manner which corresponds to the angle between the legs 50a and 58b. The arm 63a of member 63 lies flat on 50a while the control plate arm 63b lies on the part 58b and a portion of arm 63b is in addition bent upwardly along a line 66 so that the portion 63c is inclined somewhat upwardly in a longitudinal direction with respect to the rest of this arm 63b.

The springs 67 which are also provided in the parent patent cause the feeler member 64 to be pressed at all times against the control plate 63.

Upon the occurrence of the translatory revolving movements in the direction indicated by the arrow 68, which movements are imparted to the dough working member 54 via the crank members 51 and the sleeve 52, the lower edge of the dough working member 54 starting from the position of inner dead center at which it is remotest from the supporting wall 59, follows the bottom portion 50a of the conveyor and then the bottom portion 58b of the conveyor trough up to the outer dead center position at which it is nearest to the supporting wall 59, then temporarily the course of lug 63c and then again the bottom parts 50a of the conveyor trough. While said bottom edge (in the first and last periods of this movement) follows the bottom part 50a, obviously no tilting around the axis K will take place. Such tilting takes place during the other periods of the movement and, as a matter of fact, upward tilting occurs during movement over the bottom part 58b and then, due to the lug 63c, also during the first part of the rearward movement back from the front dead center position. Tilting downward takes place while the feeler member 64 begins to move from the uppermost point of the lug 63c and again approaches the control plate part 63a located above the bottom part 50a. The superimposition of translatory revolving movements and tilting movements which takes place as in the parent patent effects, as in the case of said patent, the balling of the piece of dough during its travel through the conveying trough 62 with an increasing tensioning of the surface of the piece of dough. By holding the dough working member in raised position (phantom lines in FIGURE 1) in the first part of the rearward movement away from the front dead center position, a clamping of the piece of dough between the lower edge of the dough working member and the bottom of the conveyor trough is avoided.

It is to be understood that the apparatus of this invention is susceptible of many modifications and adaptations which are well within the province of one skilled in the art. The details of the herein disclosed embodiment are not intended to be limitative, but are only intended to be illustrative of a preferred realization of the inventive concept which is herein disclosed. The scope of the invention, therefore, is intended to cover all obvious modifications, adaptations, and equivalents.

What is claimed is:

1. A dough working apparatus for transforming an irregular shaped, rough surface piece of bulk dough into a generally spherical, smooth surface ball, said apparatus comprising: a longitudinal extending channel for receiving a piece of bulk dough at a loading end thereof, said channel being defined by a bottom wall extending between spaced apart upstanding side wall members, one of said side wall members being movable relative to said bottom wall and relative to the other said side wall member, a first extent of said bottom wall being downwardly inclined in a direction towards the other of said side wall members and joining with a second extent of said bottom wall which also is downwardly inclined but to a lesser degree than the first extent, drive means connected to said movable member to move said movable member about a pivot axis in an arcuate path relative to the upper surface of said bottom wall, said movable member being pivotally mounted about a tilt axis which is parallel to the plane of said bottom wall surface, follower means on said movable member in sliding contact with said bottom wall, means for urging said movable member to pivot about said tilt axis in one rotative direction whereby said follower means is urged into contacting relationship with said bottom wall, said movable member thereby tilting relative to said bottom wall in conformity with changing inclination thereof as said movable member is drive in said arcuate path about said pivot axis.

2. The apparatus of claim 1, wherein said drive means is drivingly connected to said movable side wall member to drive said pivot axis in a circular path in a plane which is parallel to the plane of said first extent of said bottom wall.

3. The apparatus of claim 1, wherein said movable member is pivotally mounted on a support means, said support means being revolvable about an axis which is perpendicular to said movable member tilt axis and perpendicular to said first extent of said bottom wall.

4. The apparatus of claim 3, wherein said drive means comprises a rotatable first crank member, a crank web extending radially from said first crank member, a second crank member extending axially from said web, said second crank member being revolvable about the rotative axis of said first crank member, said support means connecting said movable side wall member to a radial portion of said second crank member.

5. The apparatus of claim 4, wherein said first and second crank members and said web are rigidly connected together, said support means comprising a sleeve pivotally mounted coaxially on said second crank member, said movable side wall member being pivotally mounted on a radial portion of said sleeve about an axis extending perpendicular to the rotative axis of said first crank member.

6. The apparatus of claim 1, wherein said channel is elongate between dough inlet and outlet ends thereof, said other side wall member being stationarily fixed along one edge of said bottom wall and said movable side wall member being movable along a continuous arcuate path over the upper surface of said bottom wall with said movable member alternately moving towards and away from the stationary member during movement of said movable member along respective half-segments of said arcuate path, said movable member being tiltable about its tilt axis between first and second tilt positions each of which corresponds to a working surface of said movable member defining an extreme inclined angle relative to the upper surface of said bottom wall.

7. The apparatus of claim 6, wherein said first and second tilt positions respectively corresponds to said movable member being at its furthest and nearest distances, respectively, from the stationary side wall member, in said second tilt position said working surface extending less uprightly relative to said bottom wall than in said first tilt position.

8. The apparatus of claim 6, said stationarily fixed side wall member being adjustably inclinable towards the plane of said movable side wall member in a direction towards said outlet end of said channel.

9. The apparatus of claim, wherein said first extent of said bottom wall is inclined downwardly at an angle in the order of 25° to the horizontal and said second extent is inclined downwardly at an angle in the order of 5°.

10. The apparatus of claim 1, including a control plate attached to said bottom wall at said loading end of said channel, said plate extending parallel to said second extent of said bottom wall along a longitudinal extent thereof and said plate including a surface portion which is upwardly inclined from said second extent of said bottom wall in the longitudinal direction extending away from said loading end.

11. The apparatus of claim 10, wherein said control plate upwardly inclined portion is downwardly inclined in a transverse direction towards said first extent of said bottom wall.

12. The apparatus of claim 10, wherein said follower means on said movable wall member is arranged to slide over the surface of said control plate at the loading end of said channel, and wherein said control plate is so configured that, as that movable member is revolved about said pivot axis from its transverse position closest to said other side wall member, its follower slides over said control plate and said movable member is first tilted about said tilt axis to a greater tilt angle than that which corresponds to said follower sliding over said second extent of said bottom wall, and said movable member then gradually tilts back to a tilt angle which corresponds to said follower sliding over said first extent of said bottom wall as said movable member moves away from said other side wall member.

References Cited

UNITED STATES PATENTS

| | | |
|---|---|---|
| 947,500 | 1/1910 | Streich. |
| 978,233 | 12/1910 | Streich. |
| 1,037,797 | 9/1912 | Ruffin. |

FOREIGN PATENTS

| | | |
|---|---|---|
| 292,962 | 7/1916 | Germany. |

EDWARD L. ROBERTS, Primary Examiner